March 27, 1956     E. R. ATKINS, JR     2,739,476
ELECTRIC FLOWMETER
Filed May 15, 1950     2 Sheets-Sheet 1
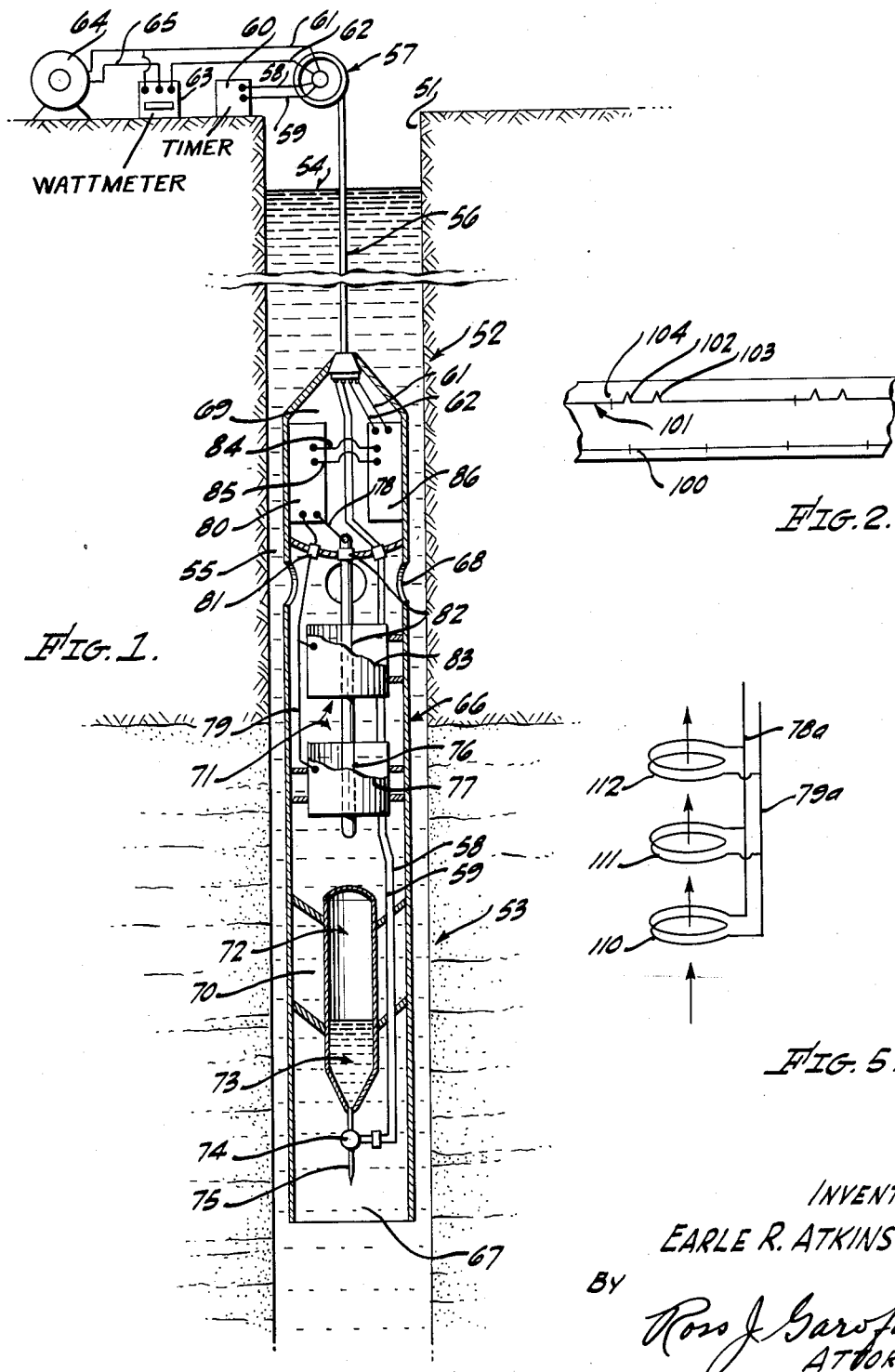
INVENTOR.
EARLE R. ATKINS JR.,
BY
Ross J. Garofalo
ATTORNEY.

March 27, 1956 E. R. ATKINS, JR 2,739,476
ELECTRIC FLOWMETER
Filed May 15, 1950 2 Sheets-Sheet 2
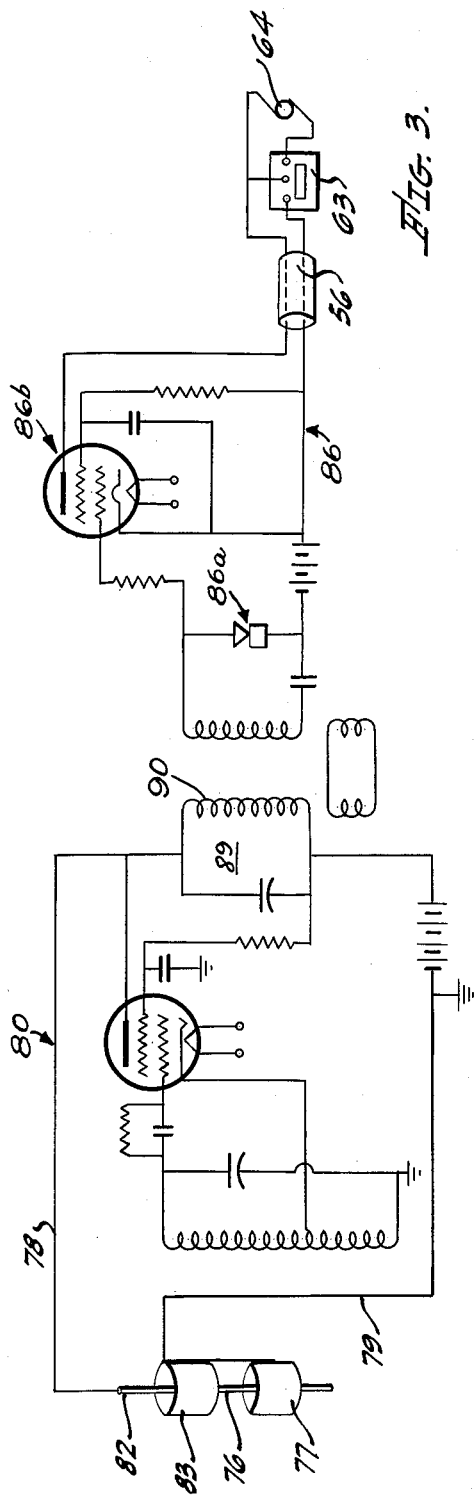
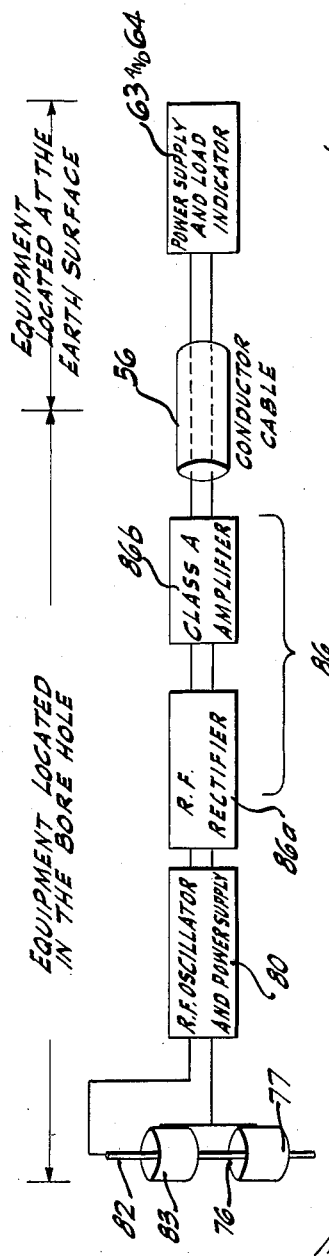
INVENTOR.
EARLE R. ATKINS JR,
BY
Ross J. Garofalo
ATTORNEY.

United States Patent Office 2,739,476
Patented Mar. 27, 1956

2,739,476

ELECTRIC FLOWMETER

Earle R. Atkins, Jr., La Habra, Calif., assignor to Union Oil Company of California, Los Angeles, Calif., a corporation of California Application May 15, 1950, Serial No. 161,916

6 Claims. (Cl. 73—155)

This invention relates generally to apparatus for measuring fluid flow. More particularly, this invention relates to apparatus for measuring the flow of liquids such as oil or water within an oil well or a water injection well.

The use of secondary recovery measures, such as water flooding, is of widespread application at the present time. In order to exploit such recovery methods to the utmost, it is desirable to determine the relative water injection rate into each of the earth formation layers. In other cases such as where oil is being produced from several formations, it is desirable to know the amount of the oil production from each stratum or from each of several sections of the strata. These problems are solved by the use of a well flowmeter and this invention is directed to a particular type of well flowmeter which is suitable for these and other uses.

It is an object of this invention to determine the fluid velocity of a flowing fluid by electrically measuring the changing dielectric constant or magnetic permeability of such flowing fluid at two or more points along the direction of fluid flow.

It is another object of this invention to determine the rate of fluid flow by electrically following the movement along the path of flow of a discontinuity of the fluid flow.

It is another object of this invention to inject a minor amount of a tracer fluid into a flowing fluid whose flow rate is to be determined and wherein the electrophysical properties of the tracer, such as dielectric constant or magnetic permeability, are appreciably different from those of the flowing fluid, and to plot the flow of such tracer fluid within the main body of the flowing fluid whereby the velocity of the latter fluid can be determined.

It is another object of this invention to measure the rate of fluid flow by measuring the dielectric constant of the moving fluid at two or more points along the direction of flow and relating the time lag between corresponding discontinuities of dielectric constant at different points to the rate of flow of the fluid.

It is another object of this invention to measure the rate of fluid flow by measuring the magnetic permeability of the moving fluid at two or more points along the direction of flow and relating the time lag between corresponding discontinuities of magnetic permeability at different points to the rate of flow of the fluid.

Briefly, this invention relates to an apparatus for the determination of liquid flow rates within a well wherein the velocity of the flowing stream is measured by estimating the rate of movement of small increments of an electrophysically dissimilar liquid suspended in and moving with the fluid stream being measured. For this purpose small increments of the electrophysically dissimilar tracer liquid are injected into a diverted portion of flowing stream, either singularly or at periodic intervals, and the arrival of the tagged increment is denoted by the corresponding fluctuations of the electrophysical character of the flowing stream at two or more detecting points along the direction of fluid flow. The two or more detecting points are separated from each other by known or calibrated distances and the time lapse between the observation of a corresponding fluctuation at two different points determines the fluid velocity throughout the distance interval.

In one modification of the invention the time of injection can be used as a point of reference which, together with one or more electrical detectors located downstreamwardly at known distances therefrom, can be used to time the flow of the electro-physically dissimilar increment over the distance interval between the tracer injection and the detecting means.

Although it is preferable to employ an artificial electro-physical discontinuity such as one created by the injection of an electrophysically dissimilar tracer liquid, in another modification of the invention the electrophysical discontinuities of fluid are those which normally occur in the flowing fluid and which are caused by normal variations of the physical or chemical composition of the flowing fluid. Such electrophysical discontinuities may, for example, be caused by entrainment of varying amounts of water in a water-saturated fluid or by varying compositions of clay in suspension or by other such natural causes.

The detecting means are substantially the same regardless of the method for effecting the discontinuity, be it natural or artificial. In the capacitance method the flowing stream carrying the discontinuity is passed between a first pair of detecting electrodes and thence through a second pair of detecting electrodes spaced downstreamwardly a fixed distance from the first pair of detecting electrodes. The arrival of that portion of liquid bearing the electrophysical discontinuity, such as an additional amount of water, causes the electrophysical property of the fluid flowing between the detecting electrodes, i. e. its dielectric constant, to change appreciably from that case where no tracer liquid is present in the fluid flowing between the electrodes, with the result that the capacitance between the electrodes is accordingly changed. Where such detecting electrodes are coupled to a recording instrument for continuously determining the relative value of the particular electrophysical property of the fluid, a large fluctuation of the electrophysical property denotes the arrival of the tracer liquid increment within the first pair of detecting electrodes. The fluid bearing the tracer liquid then flows downstreamwardly to the next pair of detecting electrodes wherein a similar fluctuation of the property of the fluid between the second pair of detecting electrodes is set up and is recorded, and generally by the same recording instrument. Suitable provision is made for a determining of the time interval or lag between the detection of a corresponding discontinuity by the first pair of detecting electrodes and by the second pair of detecting electrodes. The lapsed time for the transport of the tracer liquid between the two pairs of detecting electrodes, together with the distance therebetween, determines the fluid velocity of the flowing fluid between the two points. From these data the fluid flow of the entire stream can be determined by calculation or empirical calibration.

In another modification of the invention two or more detecting coils are employed in place of the two or more pairs of detecting electrodes in which case a discontinuity of the magnetic permeability of the fluid passing through, or near, the first coil is employed to cause a change of the inductance of the first coil. As the flowing liquid bearing the discontinuity thereafter passes through, or near, the second coil, a similar change of inductance is noted. The time lapse therebetween is used to calculate the fluid velocity from which data the flow rate can be determined substantially as described hereinbefore.

In the preferred apparatus a vertical tubular section is employed within which there are mounted two or more pairs of electrodes, or two or more coils, each pair of electrodes, or coil, being fixed a given vertical distance apart with respect to each and all others. The instrument is lowered into the well to the point at which the measurements are to be made. The normal upward fluid flow in the well is at least partially diverted into the wide lower open end of the tubular section. The fraction of the flow so diverted is determined from the ratio of the relative cross-sectional area of open end relative to the average cross-section of the well in that region by assuming that the flow over the entire area is constant and with or without making empirical corrections for the frictional drag of the instrument on the flow.

In the preferred modification an artificial electrophysical discontinuity is established by periodically injecting small increments of a suitable tracer liquid, such as various chemicals, water, brine, diamagnetic or paramagnetic substances, or the like, into the fluid stream flowing through the instrument. As the fluid flows between each successive pair of electrodes, or coil, each portion of fluid flow carrying an increment of tracer liquid will cause an abrupt change of capacitance between each successive pair of electrodes or a change of the inductance of the coil. The time lag between corresponding fluctuations between each successive pair of electrodes, or in each coil, together with the distance therebetween is a measure of flow through the instrument, which flow is proportional, or nearly proportional, to the total flow through the well. These electrical fluctations are recorded either within the well by suitable means attached to the detecting instruments or alternatively by transmitting them through a conducting supporting cable to the earth surface whereat they are recorded or otherwise measured and handled. The apparatus is adapted to be raised or lowered as desired for measuring the fluid flow at a series of points along the well.

Attached Figure 1 presents a modification of the invention wherein the electrophysical discontinuities are artifically established and the path of flow of such discontinuities is established by continuously measuring the capacitance between each of two pairs of electrodes wherein the fluid is passed successively between each of the two pairs of electrodes.

Attached Figure 2 presents a typical record of data obtained with the capacitance flowmeter of Figure 1.

Attached Figure 3 presents a suitable electrical circuit for detecting changes in capacitance in a capacitance flowmeter of the type shown in attached Figure 1 with suitable provision being made for transmitting electric signals resulting therefrom upwardly through the bore hole to an earth surface location.

Attached Figure 4 shows a schematic diagram of the electrical circuit of Figure 3 depicting each of the several separate elements of the electrical system.

Attached Figure 5 shows apparatus for determining flow rates by measuring inductance changes.

Referring now more particularly to attached Figure 1, bore hole 51 is completed through miscellaneous earth formations 52 into oil-bearing formation 53. Oil flowing from oil-bearing formation 53 fills bore hole 51, the upper liquid level being indicated at 54 and such flowing oil is removed from the bore hole by suitable means not shown. Flowmeter unit 55 is suspended at some desired point within the bore hole, such as in the proximity of oil-bearing formation 53, by means of supporting conducting cable 56 attached to and wound on winding drum 57. Supporting conducting cable 56 includes four separate insulated electrical leads. Winding drum 57 is fitted with suitable depth of instrument indicating means not shown.

At the earth surface winding drum 57 is fitted with two pairs of commutators which are electrically connected to the four insulated electrical leads within supporting cable 56. The first pair of commutators connect with leads 58 and 59 which are in turn connected to electric timer 60. Electric timer 60 is adapted to supply electric pulses periodically and at a predetermined rate, or irregularly, or singularly, to leads 58 and 59. The timer 60 may be simply a manually operable switch if only irregular pulsations of current are supplied to leads 58 and 59. If regular pulsations are desired, the timer may take the form of any conventional magnetic relay such for example as described on pages 504–509 of Standard Handbook for Electrical Engineers, Knowlton ed., 8th edition, 1949. Alternatively, for supplying regular periodic pulsations a simple drum-type switch operated by a synchronous motor may be employed such as is described on pages 1700–1701 of the above reference. The second pair of commutators connect through leads 61 and 62 to power measuring means 63 for measuring and recording the instantaneous power consumption. Power measuring means 63 may be for example a recording wattmeter, which is in turn connected to a suitable source of electric current 64 through leads 61 and 65 respectively. In the preferred modification a chart-record of the variation of the instantaneous power consumption with respect to time is obtained by power measuring means 63.

Flowmeter unit 55 comprises a long tubular section 66 having a lower open end 67 for ingress of fluid flow and holes 68 for egress of fluid flow and a fluidtight compartment 69 attached to the tubular section 66. Liquid injecting means 70 is mounted within tubular section 66 near the lower end. Above liquid injecting means 70 a detecting zone indicated generally by 71 is located within tubular section 66.

The upward flow of fluid in bore hole 51 causes at least a part of such fluid to enter the lower open end 67 of flowmeter unit 55 whence small increments of tracer liquid are injected thereinto at regular or irregular intervals, or singularly. These increments in company with the fluid flow pass upwardly past liquid injecting means 70 into and through detecting section 71 and out of holes 68 into the body of the well bore.

Liquid injecting means 70 comprises a pressured vessel 72 which is partially filled with tracer liquid 73, a solenoid valve 74 attached to the lower end of the pressured vessel 72 and a nozzle 75 attached to the solenoid valve 74 and extending a small distance below the pressured vessel 72. When solenoid valve 74 is actuated by an electric pulse from timer 60 flowing through leads 58 and 59, it opens for a short period of time thereby allowing a small portion of the pressured tracer liquid 73 to flow therethrough and out of nozzle 75 into the fluid flow passing through the tubular section 66. Tracer liquid 73 is a liquid whose dielectric constant is appreciably different from that of the fluid flow being measured. In the preferred modification the dielectric constant of the tracer liquid is about 2 to 20 times that of the fluid flow.

Part of the fluid flow within bore hole 51 enters flowmeter unit 55 through the lower open end 67 and is therewith periodically mixed with increments of tracer liquid ejected from liquid injecting means 70 through nozzle 75. The upwardly flowing fluid passes around liquid injecting means 70 and enters the detecting section 71 whence it flows between the first pair of detecting electrodes 76 and 77 respectively. Electrode 76 comprises a conducting rod coaxially mounted within cylindrical outer detecting electrode 77. The fluid flows in the annular space between the two electrodes 76 and 77 respectively. The arrival of the electrophysical discontinuity in such annular space causes an abrupt change in the capacitance of the condenser formed by the two detecting electrodes 76 and 77 respectively with the fluid and such change is transmitted through leads 78 and 79 respectively to the plate tank circuit of electron coupled radio frequency oscillator 80 housed in the upper sealed compartment 69. Lead 79 enters the sealed compartment through sealed insulator 81 while electrode 76 is suspended by means of sealed mounting 82 and projects into fluidtight compartment 69. The fluid after leaving the first pair of detecting electrodes 76 and 77 flows upwardly into the annular space of the second pair of detecting electrodes 82 and 83 respectively, which are structurally similar to the first pair of detecting electrodes and are connected to the radio frequency oscillator 80 through the same leads 78 and 79 respectively. Upon leaving the second pair of detecting electrodes the fluid flow flows up and out of holes 68 through the wall of the tubular section immediately below the fluidtight compartment 69. The fluid flow then passes upwardly through the bore hole 11 and is removed thereabove by suitable means not shown. Oscillator 80 is connected through leads 84 and 85 to unit 86 which contains a radio frequency rectifier 86a and a class A amplifier 86b. Unit 86 is supplied with electric power from power supply 64 through instantaneous power measuring means 63 and leads 61 and 62, passing through supporting conducting cable 56.

Referring now more particularly to attached Figures 3 and 4, the arrival of the discontinuity in the annular space of either pair of detecting electrodes 76—77 or 82—83 causes an abrupt change in the electrical capacitance of the condenser formed by the detecting electrodes, which are connected in parallel by leads 78 and 79 across the plate tank circuit 89 of an electron coupled radio frequency oscillator 80. A change of capacitance alters the resonant frequency of the oscillator 80 which is inductively coupled through its plate tank inductance coil 90 to a radio frequency rectifying section 86a wherein the radio frequency energy output of the oscillator is rectified, such as by a selenium dioxide rectifier. The rectified current is then coupled in series to the grid bias of a class A amplifier 86b. The rectifier and amplifier units are designated by numeral 86 in Figure 4. The power supply 64 of the class A amplifier 86b is located at the earth surface along with a suitable power measuring means 63 and such power is passed downwardly through supporting cable 56 to the amplifier located in the bore hole. When a steady flow of fluid having a relatively uniform electrophysical composition is being passed between both pairs of detecting electrodes, oscillations of a constant frequency are generated by the oscillator 80 which, upon rectification by rectifier 86a, provide a constant grid bias for the class A amplifier 86b. The power requirement for such amplifier is constant and is so indicated by the power measuring means 63. When, however, a discontinuity enters the annular space between either pair of detecting electrodes, there is a corresponding fluctuation of the frequency and amplitude of the signal generated by the oscillator. The variation of the oscillator output provides after rectification a corresponding fluctuation in the direct current applied as the grid bias to the class A amplifier. The fluctuation of the grid bias produces a sharp change in the instantaneous power requirement of the amplifier 86b. This latter change is indicated by the power measuring means 63 located at the earth surface.

Referring now more particularly to attached Figure 2, which illustrates a record of the power consumption with respect to time, trace 100 is uniformly marked with time markers at the end of some definite time interval, such as at the end of each second, minute, etc. Trace 101 is produced by the power measuring means 63 for the power consumption of the class A amplifier 86b and has peaks 102 and 103 respectively. Peak 102 denotes the arrival of the discontinuity between the first pair of detecting electrodes 76 and 77 respectively, and peak 103 indicates the arrival of the same discontinuity between the second pair of detecting electrodes 82 and 83 respectively. The distance between peaks 102 and 103 in conjunction with trace 100 denotes the time required to transport the discontinuity between the two detecting electrodes respectively. The velocity of the fluid over the fixed distance interval between the two pairs of electrodes can be calculated therefrom. In general sufficient time is allowed between each discontinuity to permit the preceding one to flow past both pairs of electrodes prior to establishing the next one. It is apparent, however, that where checks or continuous runs are not desired, the establishment of but a single discontinuity will suffice for a single determination of the flow rate.

The distance between the two pairs of electrodes is fixed and the lapsed time interval for the transport of an increment by the flowing fluid between the two pairs of electrodes therefor determines the fluid velocity therebetween. The cross-sectional area of the detection zone between the two electrode pairs is known and is used to calculate the fluid flow rate entering the flowmeter unit through lower open end 67. In one modification of the invention an external flexible packer is employed to prevent fluid flow through the annular space between the tubular section and the wall of the well bore and thus divert the entire flow through the lower open end 67. However, in the case where no such packer is employed, only a part of the fluid flow passes through the instrument and is measured while a second part passes around the flowmeter and through the annular space between the wall of the well and instrument. In such a case the flow rate measured by the instrument is multiplied by the ratio of the entire stream to the part measured in order to determine the total flow rate within the well bore. The required ratio may be assumed to be equal to the ratio of the cross-sectional area of the lower open end 67 of the flowmeter unit to the cross-sectional area of the well. In practice this latter ratio is reasonably constant for a given instrument because of the general uniformity of the well bore diameter; and the well bore flow rate is in this case proportional to the lapsed time interval for a given instrument and well bore. Alternatively, the physical constants of the system may then be determined empirically by measuring known flow rates and this data may then be used to determine unknown flow rates. Where the bore hole diameter varies appreciably, the aforementioned ratio varies also and flow rate at any point is calculated from the particular cross-sectional area at each point. In one modification of the invention a bore hole caliper may be employed in cooperation with the flowmeter in order to give a continuous reading of the bore hole diameters wherever the flow rate is measured.

In another modification of the invention the moment at which solenoid valve 74 is opened and the tracer liquid is injected into the flowing stream is also marked on the record as shown by mark 104 of Figure 2. The instrument may be so calibrated that the time lag between the injection and the subsequent detection by the first pair of detecting electrodes becomes a measure of the fluid flow.

In the modification of the invention wherein discontinuities of magnetic permeability are employed to measure fluid flow, two or more coils are employed to replace the two or more pairs of electrodes employed in the capacitance flowmeter. The coils are preferably narrow-wound and are mounted coaxially within the tubular section with all or part of the fluid flow preferably passing through their middle. The two or more coils are mounted a fixed distance from each and all others. A discontinuity of magnetic permeability is established by injecting a suitable tracer liquid into the stream. Passage of the discontinuity through each of the coils successively produces a fluctuation of the inductance of each coil. A comparison of corresponding fluctuations of inductance is used to obtain a transit time over the fixed distance between the coils whence the fluid velocity is obtained. The velocity is employed to calculate the fluid flow analogous to the capacitance modification described hereinbefore.

One inductance type of flowmeter is shown in Figure 5 wherein three coils 110, 111, and 112 are placed coaxially in a flow of fluid either in the well bore itself or with a tubular section. The coils are connected in parallel to leads 78a and 79a. A simple method for detecting inductance changes is to couple the coils to an electron coupled oscillator such as by deleting detecting electrodes 76, 77, 82 and 83 in Figures 3 and 4 and coupling lead 78a to lead 78 and lead 79a to 79. Any change of inductance of any of the three coils produces the same types of change in the oscillator and succeeding electrical components as was described for the capacitance flowmeter and the operation is entirely analogous to the previously described situation for the capacitance flowmeter. In the particular modification employing three coils a series of three fluctuations are obtained for a single discontinuity, i. e. one for the passage of the discontinuity through each of the three coils. The flow rate between any two coils can be calculated in the same manner as described hereinbefore for the two electrodes. The flow rate between the third coil and either of the first two coils then serves as a check on the first determination.

As in the case of the capacitance meter, the inductance meter may be calibrated to determine the flow rate from the recorded time interval between the injecting of an increment and its subsequent detection in a detecting zone employing the inductance method as indicated in Figure 2.

In other cases the first detecting zone may employ one method of detection, such as capacitance, and the second detecting zone may employ another, such as inductance. In such cases an inductance coil is merely substituted for one of the pairs of electrodes 76—77 or 82—83 of Figure 3.

Tracer liquids which may be employed in this invention are any of the liquids whose dielectric constant or magnetic permeability is different from that of the fluid whose flow rate is being measured. For practical purposes the tracer liquid should not react detrimentally with the metallic parts of the equipment with which it will come in contact. In the preferred modification of the capacitance flowmeter, the tracer liquid is one which is miscible with the fluid whose flow rate is being measured; there are then no buoyancy or submergence effects acting upon the increment of tracer liquid relative to the fluid flow during its transport by the fluid flow between two successive detecting electrode pairs. It is apparent that where a relative floating or sinking of the increment does occur, a corrected fluid velocity can be calculated for this situation by the application of Stoke's law, which corrected velocity would be based upon the transit time in the absence of buoyancy effects. Where the buoyancy effect is small or where high accuracy of the flow rate measurements is not required, the application of Stoke's law can be dispensed with.

Where oil flow is being measured tracer liquids such as carbon tetrachloride, ethylene dibromide, acetone, methyl ethyl ketone, methyl alcohol, ethyl alcohol, propyl alcohol, dimethyl ether, diethyl ether, methyl mercaptan, ethyl mercaptan, propyl mercaptan, dimethyl sulfide, diethyl sulfide, dimethyl disulfide, diethyl disulfide, dioxane, pyridine, quinoline, methylamine, ethylamine, propylamine, dimethylamine, diethylamine, aniline, benzylamine, acetic acid, propionic acid, butyric acid and the like, or mixtures thereof, may be used for the capacitance flowmeters. Water, oil field brine, oil-water emulsions, and the like may be employed in those cases where buoyancy is small and can be neglected, or is to be corrected.

Where water flow is being measured the discontinuity of dielectric constant may be established by adding an aqueous solution of a water-soluble inorganic salt such as sodium chloride, sodium sulfate, sodium nitrate, lithium bromate, potassium iodate, magnesium sulfate, calcium nitrate, iron chloride and the like. Small amounts of aqueous solutions of organic or inorganic acids may be similarly employed such as acetic acid, methyl sulfonic acid, sulfuric acid, phosphoric acid, nitric acid, hydrochloric acid and the like. Water-soluble polar organic compounds may be employed such as low molecular weight amines, salts, etc., e. g. methyl-, dimethyl-, trimethyl-, and ethyl-amines, sodium propionate, potassium acetate, sodium methyl sulfonate and the like.

In the case of the inductance flowmeter, the tracer liquid establishes a discontinuity of magnetic permeability in flowing fluid. The discontinuity may be established by injecting into the flowing fluid finely divided diamagnetic or paramagnetic susbtances, whose magnetic permeability is different from that of the flowing fluid. The finely-divided materials are preferably dispersed in a liquid which is miscible with flowing fluid. Finely-divided paramagnetic substances such as iron, alloys of iron with about 4% silicon, iron oxides, ferrite and the like which have a particle size of the order of about 20 microns when intimately mixed with an animal, vegetable, or mineral oil, or a silicone oil, are especially suitable for establishing a discontinuity in oil flow. These same substances when dispersed in water may be employed to measure water flow.

The foregoing descriptions of the invention have been directed to the case in which the upward flow of a fluid, such as oil or water, is to be measured. It is apparent, however, that by simply placing the outlet of the nozzle of the tracer liquid injecting means above the detecting section and by providing a large fluid flow inlet at the top of the flowmeter unit, the downward flow into the well can be measured. This type of measurement is especially useful during a water flooding secondary recovery program where it is desired to know the relative fluid flow into each of the formation taking water. In this case the inverted instrument is used to determine the downward fluid flow of the water at a series of points along the formation taking water. Between any two points the diminished flow rate is due to the lateral escape of fluid into the surrounding formation between the two points. Accordingly a plot of the flow rate along the injection interval permits a determination of the flow rate into any particular section of the interval.

While the foregoing descriptions of the invention have specifically related to the case in which a single unit is employed, other modifications may be substituted. Thus, the tracer injecting means may be suspended in the well casing by poles, cables, etc. upstreamwardly from each pair of detecting electrodes which may be likewise suspended within the well casing. In such a case the well casing corresponds to the tubular section described hereinbefore. By determining beforehand the distance between the pairs of detecting electrodes, or between the injecting means and a downstream pair of electrodes, the flow rate of the fluid within the casing may be determined as described above in connection with the unitary apparatus. This case amounts simply to a measurement of the fluid velocity within the bore hole and accordingly the cross-sectional area must be known or estimated before the flow rate can be determined.

It is apparent that if the natural variations of dielectric constant or magnetic permeability of the flowing fluid are to be employed, any of the apparatus described hereinbefore may be employed for this purpose with the exception that the timer and tracer injecting means in each case may be dispensed with. In this case a separate record of the electrical variations between each pair of detecting electrodes or coil should be made on a suitable time scale. The separate records of two successive pairs of detecting electrodes or two successive coils are then compared to find corresponding maxima, minima, wiggles, etc. and the time lapse therebetween is determined. The fluid velocity is determined from the time interval and the remaining calculations are made in substantially the same method as has been described hereinbefore.

Where the dielectric constant is to be measured (capacitance flowmeter) the electrodes are normally insulated from direct contact with the fluid flow such as by a plastic film of Lucite, Vinylite or other resin. The coils of the inductance flowmeter must normally be insulated from the fluid in order to prevent short circuiting.

While specific methods have been described herein for detecting changes of capacitance and inductance in the respective detecting electrodes and coils, it is apparent that other methods for the detection of such electrical fluctuations may be similarly employed.

The term "electrophysical" is used throughout this specification and in the following claims in reference to the electrical properties of a tracer liquid which permit it to be distinguished from the fluid flow by electrical means. An "electrophysical discontinuity" is a discontinuity of electrophysical property such as dielectric constant or of magnetic permeability. The discontinuity may be detected by passing it in conjunction with the fluid flow between two electrodes and noting capacitance changes between the two electrodes, or through or near a coil and noting the inductance changes of the coil, or by other suitable electrical means.

It is apparent that many modifications of this invention may be made by those skilled in the art without departing from the spirit and scope of the following claims.

I claim:

1. An apparatus for determining the rate of flow of a flowing fluid in an oil well which comprises a tubular section insertable in said well, means for suspending said tubular section within said well, a first insulated reactance element mounted within and toward one extremity of said tubular section, a second insulated reactance element mounted within and toward the other extremity of said tubular section, each of said reactance elements being mounted in known spaced relationship to each other and in such manner as not to obstruct fluid flow through said tubular section, an electron-coupled radio frequency oscillator, means connecting said reactance elements in circuit with said oscillator in such manner as to cause variations in power output of said oscillator in response to variations in reactance of either of said reactance elements, and power measuring-recording means electrically coupled to said oscillator to detect fluctuations in the power output of said oscillator and to indicate time lapses between said fluctuations in power output.

2. An apparatus as defined in claim 1 including a radio frequency rectifier and an electronic amplifier, inductive coupling means connecting said rectifier to said oscillator, means connecting said rectifier to the grid circuit of said amplifier, and means connecting the plate circuit of said amplifier to said power measuring-recording means.

3. An apparatus for determining the rate of flow of a flowing fluid in a well which comprises a tubular section insertable in said well, means for suspending said tubular section within said well, a first pair of insulated electrodes mounted adjacent to but spaced from each other within said tubular section and extending a short distance along the direction of flow, thus providing a passage for the flow of said fluid therebetween, a second pair of insulated electrodes mounted similarly to said first pair but spaced downstreamwardly therefrom and extending a short distance along the direction of flow, thus providing a passage for the flow of said fluid therebetween, an electron-coupled radio frequency oscillator, means connecting one electrode from each of said electrode pairs to one side of the plate tank inductance of said oscillator, means connecting the other electrode from each of said pairs to the other side of said plate tank inductance, thereby forming two electrical condensers in parallel with each other across said plate tank inductance, and power measuring-recording means electrically coupled to said oscillator to detect fluctuations in the power output of said oscillator and to indicate time lapses between said fluctuations in power output.

4. An apparatus for determining the rate of flow of a flowing fluid in a well which comprises a tubular section insertable in said well, means for suspending said tubular section within said well, a liquid injecting means mounted within said tubular section and in the proximity of the upstreamward end thereof for injecting an increment of a dissimilar liquid into the portion of said fluid flowing through said tubular section to establish a dielectric discontinuity in a portion of said flowing fluid, means for periodically actuating said injection means, a first downstreamward pair of insulated electrodes mounted adjacent to but spaced from each other within said tubular section and extending a short distance along the direction of flow, thus providing a passage for the flow of said fluid therebetween, a second pair of insulated electrodes mounted similarly to said first pair but spaced downstreamwardly therefrom and extending a short distance along the direction of flow, thus providing a passage for the flow of said fluid therebetween, an electron-coupled radio frequency oscillator, means connecting one electrode from each of said electrode pairs to one side of the plate tank inductance of said oscillator, means connecting the other electrode from each of said pairs to the other side of said plate tank inductance, thereby forming two electrical condensers in parallel with each other across said plate tank inductance, power measuring-recording means electrically coupled to said oscillator to detect fluctuations in the power output of said oscillator and to indicate time lapses between said fluctuations in power output.

5. An apparatus for determining the rate of flow of a flowing fluid in a well which comprises a tubular section insertable in said well, means for suspending said tubular section within said well, a first insulated coil mounted within said tubular section and extending a short distance along the direction of flow, a second insulated coil mounted similarly to said first coil but spaced downstreamwardly therefrom and extending a short distance along the direction of flow, an electron-coupled radio frequency oscillator, means connecting one terminal from each of said coils to one side of the plate tank inductance of said oscillator, means connecting the other terminal from each of said coils to the other said of said plate tank inductance, thereby forming two inductance coils in parallel with each other across said plate tank inductance, and power measuring-recording means electrically coupled to said oscillator to detect fluctuations in the power output of said oscillator and to indicate time lapses between said fluctuations in power output.

6. An apparatus for determining the rate of flow of a flowing fluid in a well which comprises a tubular section insertable in said well, means for suspending said tubular section within said well, a liquid injecting means mounted within said tubular section and in the proximity of the upstreamward end thereof for injecting an increment of a dissimilar liquid into the portion of said fluid flowing through said tubular section to establish a dielectric discontinuity in a portion of said flowing fluid, means for periodically actuating said injection means, a first downstreamward insulated coil mounted within said tubular section and extending a short distance along the direction of flow, a second insulated coil mounted similarly to said first coil but spaced downstreamwardly therefrom and extending a short distance along the direction of flow, an electron-coupled radio frequency oscillator, means connecting one terminal from each of said coils to one side of the plate tank inductance of said oscillator, means connecting the other terminal from each of said coils to the other side of said plate tank inductance, thereby forming two inductance coils in parallel with each other across said plate tank inductance, power measuring-recording means electrically coupled to said oscillator to detect fluctuations in the power output of said oscillator and to indicate time lapses between said fluctuations in power output.

References Cited in the file of this patent

UNITED STATES PATENTS

| | | |
|---|---|---|
| 455,571 | Menzie | July 7, 1891 |
| 1,611,502 | Allen | Dec. 21, 1926 |
| 1,616,481 | Allen | Feb. 8, 1927 |
| 1,652,472 | Erwin et al. | Dec. 13, 1927 |
| 2,353,382 | Barrett | July 11, 1944 |
| 2,453,456 | Piety | Nov. 9, 1948 |
| 2,485,579 | Elliott | Oct. 25, 1949 |
| 2,569,974 | Campbell | Oct. 2, 1951 |
| 2,577,612 | Fay | Dec. 4, 1951 |
| 2,631,242 | Metcalf | Mar. 10, 1953 |

FOREIGN PATENTS

| | | |
|---|---|---|
| 456,131 | Great Britain | Nov. 3, 1936 |
| 615,769 | Great Britain | Jan. 11, 1949 |